US006862696B1

(12) United States Patent
Voas et al.

(10) Patent No.: US 6,862,696 B1
(45) Date of Patent: Mar. 1, 2005

(54) SYSTEM AND METHOD FOR SOFTWARE CERTIFICATION

(75) Inventors: Jeffrey M. Voas, Sterling, VA (US); Anup K. Ghosh, Fairfax, VA (US)

(73) Assignee: Cigital, Dulles, VA (US)

( * ) Notice: Subject to any disclaimer, the term of this patent is extended or adjusted under 35 U.S.C. 154(b) by 526 days.

(21) Appl. No.: 09/847,624

(22) Filed: May 3, 2001

Related U.S. Application Data

(60) Provisional application No. 60/201,688, filed on May 3, 2000.

(51) Int. Cl.[7] .............................................. G06F 11/00
(52) U.S. Cl. ........................................ 714/38; 717/126
(58) Field of Search ............................. 714/38, 39, 45, 714/57, 43, 46, 47, 37; 717/126, 124, 141, 168–172, 4, 11

(56) References Cited

U.S. PATENT DOCUMENTS 4,870,575 A * 9/1989 Rutenberg ..................... 716/4
5,253,184 A * 10/1993 Kleinschnitz ................ 702/184
5,500,941 A * 3/1996 Gil ............................... 714/38
5,548,718 A * 8/1996 Siegel et al. .................. 714/38
6,357,019 B1 * 3/2002 Blaisdell et al. .............. 714/38
6,453,468 B1 * 9/2002 D'Souza ...................... 717/168

* cited by examiner

*Primary Examiner*—Nadeem Iqbal
(74) *Attorney, Agent, or Firm*—Shaw Pittman LLP

(57) ABSTRACT

A method and method that builds accurate operational profiles for COTS software. The systems and methods disclosed allow software vendors to detect misused and unused features; identify common machine configurations for a given piece of software or software component; monitor changing user habits as new software version are released; derive more accurate testing methods for in-house testing purposes; and create user manuals which focus on those features most frequently used, or misused, by users. The disclosed system and method provides the tools enabling a software certification laboratory (SCL) to gather detailed usage data and failure data for a software application as it is used in the field. With this data the SCL can confidently issue certificates of reliability for software products.

18 Claims, 4 Drawing Sheets

SYSTEM AND METHOD FOR SOFTWARE CERTIFICATION

This application claims the benefit of U.S. Provisional Application No. 60/201,688, filed May 3, 2000, which is herein incorporated by reference in its entirety.

BACKGROUND

1. Field of the Invention

The present invention relates generally to computer software design and quality control, and, in particular, the present invention relates to software certification systems and methods.

2. Background of the Invention

The concept of building "operational profiles" has long been used in major industries, such as aviation and telecommunications, to certify that a particular product or system will operate reliably and accurately for its intended purpose. In those industries, expensive data gathering techniques and test procedures can be justified due to the critical nature of the systems. For example, the failure of some aircraft component or subsystem could result in loss of life or hundreds of millions of dollars in lost revenue or equipment repairs. Similarly, the failure of a telecommunications node could result in service loss for millions of customers. Accordingly, such high profile, high risk industries can afford, and indeed in many cases are legally required, to perform sufficient testing to provide some level of quality assurance. Other industries have also been able to gather sufficient testing data in cases where the cost-profit margin is very large, or the systems are predictable enough to contain the testing expenses.

Another reason some industries have been successful in building accurate operational profiles is the wealth of historical data available. For example, the telecommunications industry has been able to collect profiles from thousands of "user years" over decades of calendar time. Similarly, after nearly 100 years of building aircraft, there are few operational anomalies that are not known to aircraft manufacturers. Historical data is important in providing a baseline against which testing and certification can be judged.

When sufficient testing is conducted the products may be "certified" either by the vendor, the government or some independent third party entity. Such certification may state that the products will perform to a certain level of reliability and accuracy (also referred to herein as "correctness"). The certification may even be accompanied by a warranty to insure users against product failures.

Unlike the industries described above, a typical vendor of commercial off-the-shelf (COTS) software cannot currently certify its software products without assuming enormous risks. This has been true for many reasons, but the primary cause has been the inability to predict every case that a software product will encounter in actual use by the population at large. In the software industry, an operational profile would be defined as a set of input events and operating environment that the software will be exposed to during execution, along with the probability some result will occur. This definition has worked fairly well for embedded software, i.e., software developed for limited purposes that is customized for specific hardware environments with fixed memory, fixed disk space, fixed processor speeds, and the like.

With COTS products, software testing and certification has not been practical due to the number of variables involved. COTS software is typically designed according to the operating platform upon which the software runs. That is, most COTS products are designed to be hardware platform independent. However, the reality is that the total environment, i.e., hardware, operating system, other applications concurrently running on a system, and the user's interaction with the system, all affect the operational profile of a COTS product. In order to confidently certify that a given COTS product is accurate and reliable, a means for gathering sufficient testing data for the wide variety of operational environments is needed. Additionally, certification would require a system and method for tracking and analyzing the collected data to formulate a reasonable probability estimate of the software's reliability and/or accuracy.

Another reason that the software industry has not been successful in providing certification for COTS products is the lack of historical data. The software industry is still in its infancy in comparison with the aircraft and telecommunications industries. The resulting dearth of historical data leaves each software vendor on its own in any efforts to establish a certification program or process.

Without such a certification process, COTS consumers, both business consumers and individual consumers, must rely on the reputation of the software's developer or vendor, marketing campaigns, anecdotal evidence from colleagues, and published software reviews in order to decide which software applications to buy. Even published reviews rarely deal with the quality of the software, nor can they since they do not have adequate time or resources to fully test the software. As a result, consumers have no independent, third-party appraisal of the quality of software, on which they may be heavily dependent, prior to buying or installing the software. As used herein, the terms software vendor, software publisher and software developer are used generally to mean the entity responsible for providing a some software product to consumers, either directly, or indirectly.

As described above, software vendors today can only test their software in a limited number of configurations, in a limited number of environments. Such limited configurations and operating environments provide software vendors with only limited input data for their testing processes. To maximize efficiency, software vendors generally develop and test code for a set of generic, "mythical," users. This results in software products that are riskier for all users, because the products have not been tested according to how they will actually be used in the field.

In addition to testing software according to the mythical user, some COTS software vendors have attempted to provide quasi certification by certifying that their software development processes or personnel conform with standards set forth by various organizations. For example, the International Standards Organization has promulgated ISO9000 and the Software Engineering Institute has developed its Capability Maturity Model (SEI-CMM). In such approaches, software vendors usually take oaths concerning which development standards and processes were used, and auditors may "spot check" a vendor's project documentation to ensure that such documentation is consistent with the oaths taken. However, even when a software developer is truthful and follows a development cycle consistent with a given standard, high quality software is not guaranteed.

More recently, other software developers have attempted to create accurate operational profiles by monitoring application environments. One such example is a product called PureVision, which was offered by Pure Software, and released in 1995. PureVision allowed a software vendor to produce software that was able to monitor itself when running on a user's computer. Each copy of the software would send back a report to the vendor which included a list of the users at a given site who used the product, the software version number, system configuration, times when the software started and stopped executing, which program features were used, and the amount of memory used at exit. In addition, if the product failed, exit codes and a stack dump were added to the report.

Pure Software knew that users would be wary of vendors looking over their shoulders and thus included an option by which a user could inspect a report before it was sent back, as well as an option to not send a report back at all. It is speculated that PureVision did not survive because users were unwilling to provide or uncomfortable providing such detailed, non-technical information to outside groups. Moreover, the product itself could not provide software certification because it only gathered the data, but did not provide any analysis.

Another product previously used in the art is The Netscape Quality Feedback Agent, which began shipping with version 4.5 of Netscape Navigator (available from Netscape Software, Inc). The Netscape Quality Feedback Agent sends feedback to Netscape's application developers concerning how the product is performing. The agent is enabled by default and is activated when the software encounters some type of run-time problem. The agent collects relevant technical data and displays a form in which a user can type comments. Netscape intends to use this data to debug known problems and identify new ones as they arise. However, as with PureVision, the agent raises many privacy issues that leave consumers with little assurance that their personal information is protected. Moreover, the agent also relies on the willingness of users to actively provide comments, fill-out forms and actually submit the data, when an error is detected.

Another software testing model used in the prior art is the distribution of pre-release, or "beta," copies of software to pre-qualified users in exchange for feedback concerning product stability, usability, and reliability. For example, the Microsoft Corporation has long employed beta-testing as a way to collect information on how their products perform in real world environments. Microsoft uses this information to decide when a product is ready for general release.

Finally, although not technically an operational profile system, the so-called "open source" model for software development has resulted in a greater degree of software reliability in some cases. The classic example is that of the Linux operating system. Linux is a Unix operating system project that is the product of hundreds of users, all of whom donated their time to write and test the system. Linux is considered to be the most reliable of all Unix operating systems. In fact, the success of Linux is often used as the argument for why an open source model should be used by other companies. Even so, the open source model does not certify software and no vendor or other entity has certified or warranted Linux as a highly reliable and accurate operating system software.

In each case described above, a fundamental flaw in the software testing and "certification" process is the strong reliance on the software vendor or auditors to certify that certain procedures have been followed, or that a sufficient amount of data has been gathered to provide a statistically sound analysis of a product's reliability. One way to overcome this flaw is to establish an independent "software certification laboratory" (SCL) that tests software and issues a "certificate" if a product meets some pre-defined criteria. The idea of an SCL is not new, but the formation of such an entity has not been successful in the past for practical reasons. A key reason why SCLs have not become widespread is the liability of a "certifier." Such liability arises from the fact that when certified software fails in the field, the certifier bears some level of liability due to the certifier's representations as to the quality of the software.

To reduce an SCL's liability, accurate methods for making certification decisions must be employed. Unfortunately, even the best statistical analysis and testing techniques often fail to consider the actual stresses that software will experience when used in the field by real end-users. Such stresses may arise, e.g., due to user error, or unusual hardware or software configurations on which the software must run. Thus SCLs suffer from the problem of accurately determining how well-behaved a software product will be in the future. Such anticipated behavioral characteristics are a key piece of information needed by an SCL before it could offer a meaningful certificate of the software.

SUMMARY OF THE INVENTION

The present invention provides a system and method for certifying and even warranting COTS products. Additionally, the present invention can be used to certify common procedure libraries which are used by a variety of applications. Examples of such procedure libraries are the control libraries installed with the well-known Windows operating system in the form of dynamic link libraries (DLLs). Other examples include remote procedure calls (RPC's) commonly used in Unix operating environments. The present invention may foster greater reuse of such certified common libraries throughout different classes of applications as a result of the certification of such libraries. The present invention can also be used to certify "mobile" code which often executes within interpreters embedded within software applications. Examples of mobile code include Microsoft NET, Java and the like.

Unlike previous certification schemes, the present invention does not rely on auditors' or publishers' oaths. Rather, the present invention facilitates product certification through the creation of an independent agency, company, or other entity which serves as an SCL. The present invention provides the tools needed by the SCL to perform the essential data collection and analysis needed before a certificate can be issued. Accordingly, the present invention greatly reduces the liabilities faced by SCLs and eliminates the need to dispatch human auditors by combining features from several previously existing software certification systems and adding new functionality. The present invention provides a mechanism for the SCL to fully harness the testing resources of volunteer end-users, while assuring the users' privacy is safeguarded.

It is an object of the present invention to certify software for reliability based on the actual usage of real users and to establish detailed analyses of failure data to aid vendors in detecting, isolating, and removing faults from software.

In one aspect, the present invention provides a system and method for generating software certificates of reliability based on the field performance of software from real users. In another aspect, the present invention provides the capability to produce detailed failure analysis reports based on executions observed to have failed. While distinct, these two aspects of the present invention can utilize the same instrumentation technology and distribution infrastructure also provided by the present invention.

As described in the background section above, a valid software certification system and method needs to have adequate test data from a sufficient variety of operating environments. To meet these needs, the present invention provides a system and method for monitoring the reliability of software in its operational environment. In a preferred embodiment, a software certification laboratory (SCL), independent of the software vendor, can use the present invention to collect and process data from users who have volunteered to participate (with an incentive similar to those found in beta test programs). Using the data and tools provided according to the present invention, the SCL can issue a software certificate based on the software product's actual reliability in the field. The existence of such certificates will allow potential software users to make a much more informed decision concerning how a particular candidate product will operate in their environment than is possible using conventional systems and methods.

This certificate will be a powerful weapon for software consumers to gauge the reliability of software in different configurations and environments. The certificate will also serve as a powerful marketing and differentiating lever for software vendors who can pitch quantitative statements about the reliability and accuracy of their software products in different environments. The certificate is provided to the vendor, who can choose to release the certificate, or choose to improve the reliability of the product and re-certify before releasing the certificate.

As stated above, the second aspect of the present invention provides a system and method for collecting information about run-time problems that the software encounters in these "real world" user environments. Once the software is automatically observed to have failed, not only can reliability data be generated for software reliability certificates, but also detailed internal sensors can report symptoms and causes of the failure, including debugging information, back to the SCL, or other concerned party. This failure data, reported for each failed execution among the thousands of users, can be analyzed for root causes of failure, then statistically analyzed and correlated with other failure modes for the software when run under and different configurations. The results of the analysis can be then be provided to the software vendor as value-added information to aid the vendor in identifying root causes of software failures observed in operational environments. Having access to such detailed analyses of software failures allows the software's developer to greatly improve the reliability of the software for the next release version.

In addition to failure data, the present invention can capture and report on feature/function usage of software applications. A statistical analysis of feature/function usage for a given vendor's software application among thousands of users will provide the vendor operational usage information on which features of the application are used most often, and conversely, which features/functions are least often used. This information can be leveraged by software architects to reduce software bloat and costs, and by marketing personnel to determine which features are in most demand or most useful to help strategize feature development for future product releases. The value of this information cannot be understated, given that software vendors are often out of touch with how their software is actually used in different environments, as well as information about which environments, platforms, and configurations their software is most often executed. Armed with this information, software vendors will be able to better tailor and test their products according to their "real" users needs. As a result, this feedback loop, which directly includes users, can actually change the way in which new products are tested and evolve (e.g., new features are added, heavily used features are enhanced, and unused features deleted).

DETAILED DESCRIPTION OF THE INVENTION

The present invention presents a model that builds accurate operational profiles for mass-marketed software. The present invention provides such operational profiles by first redefining operation profiles to better reflect all external factors that can cause mass-marketed software to fail. Publishers may see benefits from the operational profiles generated by the present invention, including, but not limited to: (1) detection of misused and unused features, (2) identification of most common machine configurations for a given piece of software or software component, (3) monitoring of changing user habits as new software versions are released, (4) derivation of more accurate testing methods for in-house testing purposes, and (5) creation of user manuals which focus on those features most frequently used, or misused, by users. The present invention provides publishers with an unprecedented amount of information detailing the usage of a software application in the field. Such information may allow software publishers to make better long-term business decisions concerning consumer feature preferences.

The present invention creates a certification methodology that does not employ auditors or publisher oaths. Rather, the present invention allows completely independent product certification. Such certification may satisfy both the needs of consumers and publishers, as described above. In addition, certifications based on the methods described herein may allow insurers to issue policies covering software, subject to the conditions set forth in such certifications.

To build a valid operational profile for a particular software product, the present invention utilizes improved residual testing techniques. Residual testing is testing in which software is monitored as it operates in the field. Residual testing employs instrumentation that is embedded in operational software to collect information about software behavior as it is used. Such information can include factors such as, but not limited to, executed software code, failed assertions, software failures, and software usage. For example, the present invention may measure the frequency with which certain features are called and store such data as files for easy use by an SCL. An SCL may then use such information to create an operational profile. Once an operational profile has been created and software quality and reliability have been determined, such information may serve as the basis for issuing software quality certificates or warranties.

First Embodiment of the Present Invention

Figure 1:
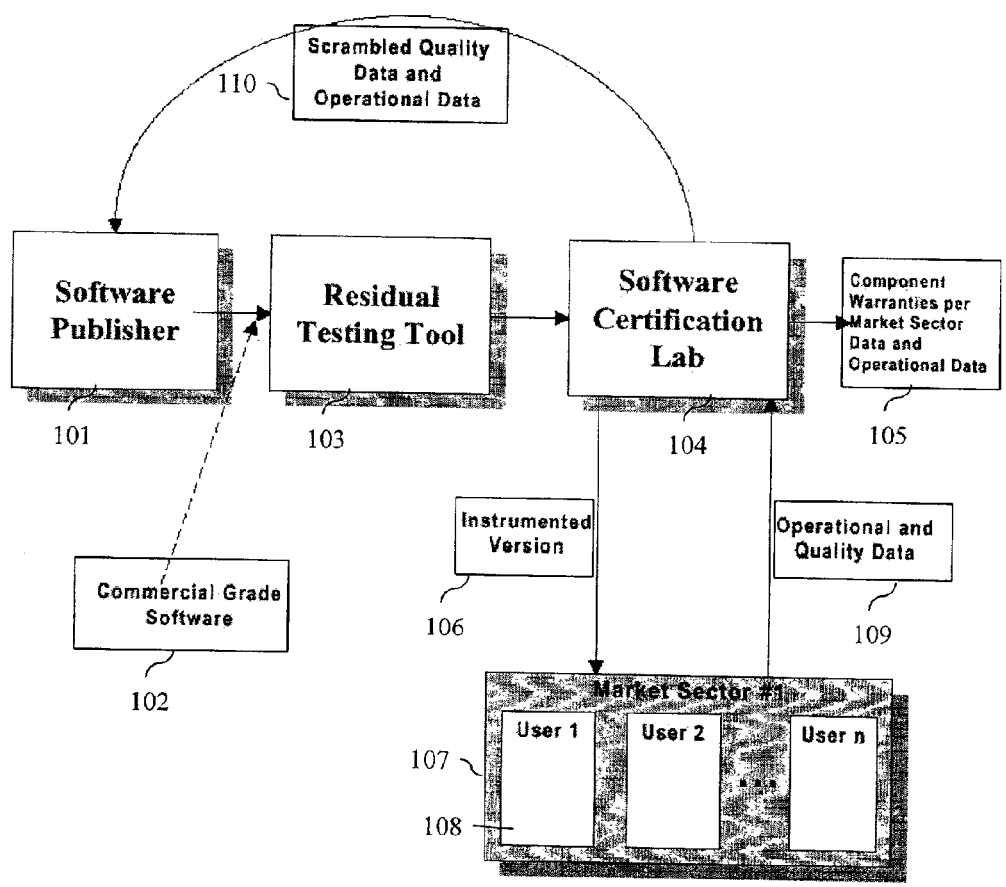
FIG. 1 is a functional diagram illustrating one embodiment of a software certification system and method of the present invention.

As FIG. 1 illustrates, Software publisher 101 may submit a release candidate product, illustrated by Commercial Grade Software 102, to Residual Testing Tool 103. Residual Testing Tool 103 may add additional code to the core functionality available in an application, and create similarly instrumented copies of the software for testing purposes.

Instrumented copies may then be sent to Software Certification Lab 104, which may distribute the Instrumented Versions 106 to Market Sector 107, or to multiple market sectors. An appropriate market sector or group of market sectors in which software is to be tested may be chosen by a software publisher or by an SCL based on the anticipated use of a given piece of software, or to test an application in a new market.

Users may be chosen from within a particular market sector based on user profile information. User selection may be based on factors such as anticipated use levels and known hardware configurations to ensure a proper test. Users selected to participate in a software trial may opt out of such trials at their discretion; however, users opting out of such trials may be required to uninstall software provided them, or to otherwise compensate an SCL or publisher.

As instrumented software operates on a user machine, an SCL may periodically gather Operational and Quality Data 109 from user sites, or instrumented software may periodically report Operational and Quality Data 109 to an SCL. Instrumented Version 106 may include encryption and signature software, so that data transferred between Instrumented Version 106 and an SCL may be properly verified, and to protect such data from outside monitoring.

Once collected, an SCL may merge user information and calculate statistics based on the merged information. An SCL may reserve property rights to such collected data, and an SCL may serve as a trusted third party, even distributing such data to the public at large, much like Consumer's Union does with its Consumer Reports Magazine.

Software Certification Lab 104 may also provide Scrambled Quality Data and Operational Data 110 to Software Publisher 101. Scrambled Quality Data and Operational Data 110 may include statistical data indicating how a particular application or software component product was used, and data indicating the quality or reliability of a particular product. In addition, Software Certification Lab 104 may generate such information in such a manner as to reduce the likelihood that statistics could be traced to a specific user. The anonymity provided by an SCL is important, as users may be encouraged to participate in software certification efforts based on anonymity assurances by an SCL.

The present invention further reinforces the trustworthiness of an SCL by encouraging SCLs to implement confidentiality agreements between themselves and software publishers, and between themselves and users. Such an agreement may be implied whenever a user downloads or is otherwise provided with software by an SCL. An agreement may also be included in a testing or certification contract between an SCL and a software publisher.

Software Publisher 101 may use Scrambled Quality Data and Operational Data 110 to improve an application or component prior to releasing it to the general public. Software Certification Lab 104 may use the same data as a basis for reviewing and certifying software at the time of its release.

Second Embodiment of the Present Invention

Figure 2:
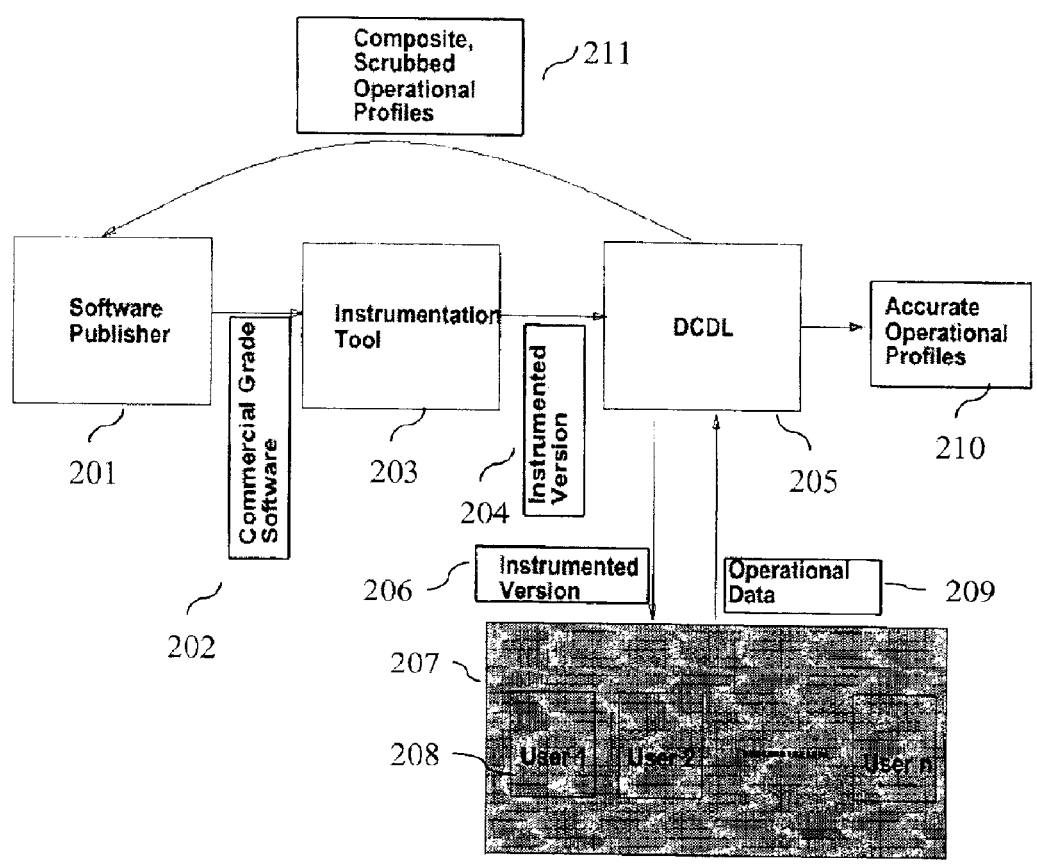
FIG. 2 is a functional diagram illustrating an alternative embodiment the present invention.

A second embodiment of the present invention is illustrated in FIG. 2. Although similar to the process in FIG. 1, the process outlined in FIG. 2 is for versions which are intended for distribution to the general public. As illustrated by FIG. 2, Software Publisher 201 subjects finished, Commercial Grade Software 202 to Instrumentation Tool 203. Instrumentation Tool 203 creates Instrumented Version 204, which contains various tools, including those for software monitoring, encryption, and digital signatures.

Instrumented Version 204 may be supplied to Data Collection and Dissemination Lab (DCDL) 205. Instrumented Version 204 may collect feature usage and external environment data while in use. DCDL 205 may then supply an instrumented version to users willing to use such a version. Users may receive incentives to use Instrumented Version 204, such as free or reduced price software.

As users continue to use Instrumented Version 204, a DCDL may collect usage information. Collected data may be "scrubbed" of personal information either at a user site or at a DCDL. Further, scrubbed data may be combined with data collected from other users to create an operational profile before such data is distributed. As with the testing process illustrated in FIG. 1, statistics used in operational profiles may be generated in a manner that reduces the likelihood of a backwards trace to a specific user.

As an SCL or DCDL collects statistics regarding a particular software application or component, an SCL or DCDL may issue limited warrantees governing the reliability of such software. A warrantee issued by an SCL or DCDL may be limited as to the platforms, market sectors, environments in which software is used, and other such factors, based on statistical information collected. As statistical information becomes available for additional market sectors, platforms, environments, and the like, an SCL or DCDL may broaden a warrantee to include those additional factors.

SCL- or DCDL-issued warrantees may also be used in conjunction with SCL or DCDL generated statistics by those in environments which are similar to those for which an application is certified to justify using such software in those new environments. For example, if a supplier of a safety-critical product reviewed SCL or DCDL collected data and determined that software was certified for an environment similar to a safety-critical product's environment, a supplier may choose to employ such software. As an SCL or DCDL collects data from such new environments, an SCL or DCDL may also warrantee such software in those new environments.

Third Embodiment of the Present Invention

In another embodiment of the present invention, it may also be used by Application Service Providers (ASPs) as a means by which application usage is monitored, and by which application users are billed. Rather than a traditional ASP business model in which an entire generic application is licensed for a large number of users, users may license only those features in which they are interested.

Description of Components Used in Preferred Embodiments of the Present Invention In preferred embodiments of the present invention, five general components can be beneficially combined: (1) an infrastructure and process for software certification, (2) a technology and process for collection of reliability and failure data from field users, (3) a system and method for creating software reliability certificates, (4) a system and method for analyzing failure data, and (5) a system and method for analyzing feature/function usage.

Infrastructure and Process for Software Certification

Figure 3:
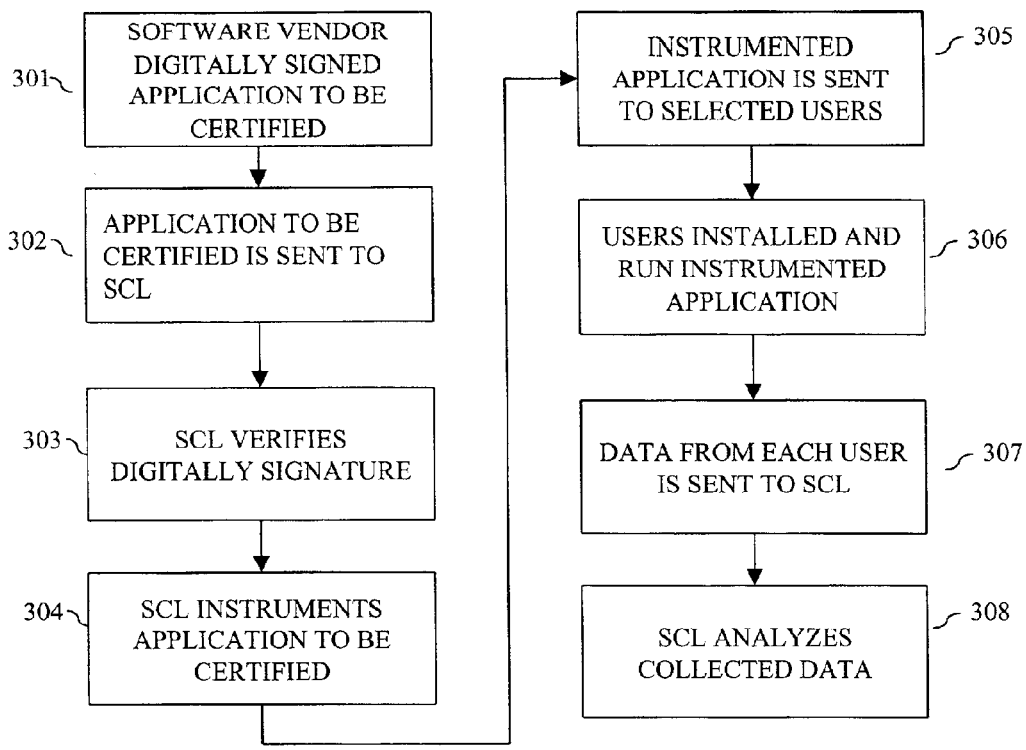
FIG. 3 is a flow diagram showing steps used in one embodiment of the present invention.

In order to leverage the user-base of software to generate software certificates of reliability, an infrastructure and process for distributing, collecting, and analyzing software and data is needed. The infrastructure can use existing communications networks, such as the Internet, to minimize infrastructure-building costs. However, from a practical standpoint, using the Internet will require additional consideration for the security of the distributed executables and the privacy of users' data. As shown in FIG. 3, in step 301, a software producer or vendor digitally signs an application to be certified. In step 302, the application code is sent to the SCL. In step 303, the SCL checks the digital signature to ensure the authenticity and integrity of the software. Industry-standard digital signing approaches for software such as Microsoft's Authenticode can be used for this purpose. In step 304, the SCL instruments the software with sensors. The process of instrumenting the code and the sensors required to support generation of software certificates and collection of failure data are described in more detail in subsequent sections. Once instrumented, the code is sent to the user group in step 305. In step 306, the users install and run the software as they normally would.

In a preferred embodiment, instrumented software is distributed only to users who consent to participate. Users may be selected by standard beta-testing selection processes, such as Microsoft's beta test program. An important difference between the present invention and a typical beta-test system is that users will be running commercial release versions of software (i.e., not necessarily beta release versions) and users need not expend time or energy to report results of beta testing efforts. The number of participating users is determined by the SCL. Fewer users will require longer field usage time to collect enough data to generate certificates with high confidence. Additionally, fewer users may result in certification for fewer operating environments.

When a user runs the instrumented software, the sensors begin recording information about its environment and its execution. Characteristics about the software's environment including the operating system version, service level, the CPU, on-board memory, available disk space, and other applications installed on the machine can be recorded. No personally identifying information including global unique identifiers, user identification, passwords, or machine names need be recorded.

Characteristics about the software's execution can also be recorded, including items such as, start time, number of concurrent threads/processes started, exceptions, software internal state errors, abnormal/normal terminations, and end times. In a preferred embodiment, instead of sending all raw data back to the SCL (creating a massive data processing problem for the SCL and potentially clogging local area networks), raw data may be processed locally on the machine as it is created. The processing may include statistical aggregation of the types of behaviors the SCL is interested in observing. Examples include the duration of process execution times, number and type of internal state errors observed, the average/min/max number of concurrent threads or processes started, and statistics for memory access violations, exceptions, and other errors. Once processed in aggregate, the individual data points may be flushed for efficiency. Data may be stored in a standardized format to simplify data analysis and viewing. For example, an XML template may be used to keep data fields organized. All stored data can be made available for review by the software user to ensure no personal information is collected or distributed.

In step 307 data from each user is sent to the SCL. Such data transfer may be triggered by an abnormal termination of a process (e.g., a fatal error) or on a periodic basis (e.g., send data file after: X number of fatal error occurs or Y transactions/use cases or Z continuous hours of operation, etc.). To protect the data, it should be transferred to the SCL over an SSL (Secure Sockets Layer)-encrypted connection. SSL, an industry standard developed by Netscape, provides authentication of the SCL and confidentiality and integrity of the data sent to the SCL. This method ensures that no other party can interpret the data sent from the user.

In step 308 the SCL collects, collates, and analyzes all data received from users of a particular software application version release. The SCL may produce two types of output, both of which may be sent to vendors: (1) a software reliability certificate, and (2) analysis of failure data for a given application. A software reliability certificate can be created when enough executions are run. What constitutes enough executions is a function of basic statistics and the level of certification being sought. The SCL can use confidence intervals to estimate reliability based on the number of observations received. Additionally, when enough data is collected from the field for a given configuration, the SCL can issue a software reliability certificate specific to the application's environment. For example, an SCL certificate might read as:

Given a Pentium-class computer, with 128 MB of ram, under light to moderate load, running Windows 2000' (service pack 1), software vendor SV's web server 'WS' v2.0a was observed to have MTTF=1000 hrs.

Given the number of different configurations from which data is collected, the certificates should to be created at an appropriate granularity level useful to both vendors and consumers. In a preferred embodiment, a hierarchical subsumption structure for certificates is used so that the highest level of granularity provides the most conservative estimate of reliability over all the configurations it subsumes.

The second output is the analysis of the failure data. The SCL can perform statistical analyses of failure data to correlate failures from different users and even different configurations in order to isolate parts of code where the failure may have originated. The analysis algorithms for failure data are described in more detail in subsequent sections below.

Data Collection Technology and Process

In order to enable the generation of software reliability certificates and analysis of failure data, the software application must be instrumented to collect data about its executions from its user base. In a preferred embodiment, the SCL should instrument the application in order to preserve the integrity of the process. For example, a software vendor would be less apt to completely instrument a program to detect possible failures because more observed failures can result in a lower software reliability rating. Likewise, in a preferred embodiment, the SCL instrumentation process preferably operate on programs delivered in executable binary format. This is a practical consideration as software vendors are loathe to share program source code with external entities for fear of losing intellectual property to competitors.

The general approach to instrumenting executables is platform-independent, however, the specific implementation will necessarily be executable-format specific. In one embodiment of the present invention, the target platform is the WindowsNT/2000 platform, running Windows 32-bit (Win32) executable file format binaries using the Intel x86 instruction set. Other embodiments may target other platforms, e.g., Unix systems, including specific variants such as Sun Os, Solaris, Linux, Iris, and the like. The following section describes in full detail, how to instrument an application for the Windows platform. It would be apparent to one of ordinary skill in the art how to perform similar instrumentation for other operating system platforms.

Technically, working with the Win32 Portable Executable file format offers difficulties over working with binaries compiled for Unix platforms for several reasons. A difficulty with Win32 executables is that though some of the libraries may be statically identified in executable headers, many DLLs are identified and loaded at run-time. Therefore, the instrumentation approach must be able to dynamically track and instrument DLLs loaded at run-time.

While discovering DLLs presents its challenges, simply instrumenting Win32 binaries also poses significant challenges. While the structure of Win32 Portable Executable (PE) header is well-defined, the executable's internal structure is often structured in an arbitrary fashion by today's compilers that interleave code and data within the text segment. Thus, statically unraveling and distinguishing executable instructions from data within the executable image presents difficulty. Failure to do so properly can result in broken executables or the inability to instrument large portions of the code.

Win32 applications are highly multi-threaded. Accordingly, the instrumentation must be able to address synchronization issues between threads, lock-outs, contention, and thread management. The instrumentation should introduce only negligent performance overhead since the application will be delivered to end users.

In one embodiment, instrumentation is based on binary editing of executables, sometimes also called binary re-writing. Binary re-writing has traditionally been performed for program optimization, profiling, tracing, understanding, transformation, and performance analysis. Determining reliability of software and capturing failure data for failure modes analysis is a novel application of binary editing and will impose new and different requirements on binary editing.

Instrumentation reads in the application to be certified, applies a set of transformations to the code, and then re-writes the instrumented binary. The program transformations will involve instrumenting code with sensors to record failure events as well as to signal reliable behavior (e.g., instrumentation of a heart beat).

Figure 4:
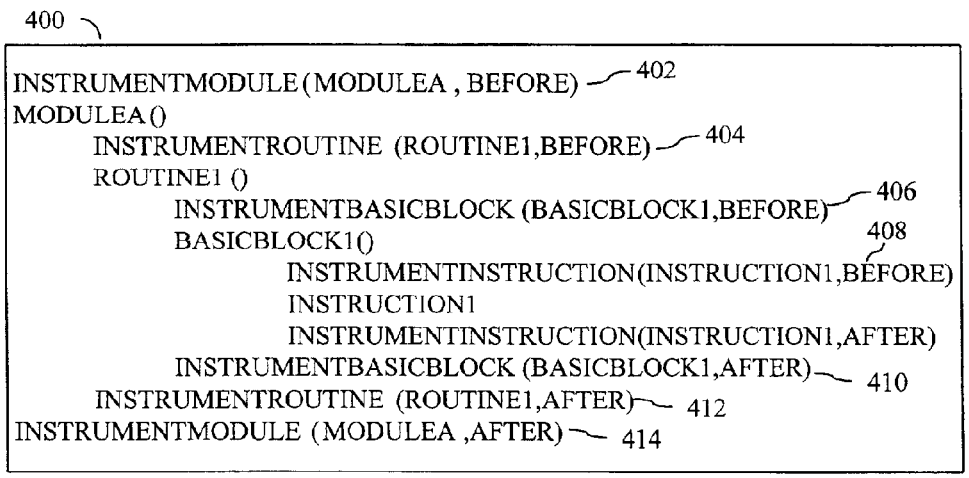
FIG. 4 shows the structure of a routine that can be used in an instrumentation according to one embodiment of the present invention.

FIG. 4 shows a generic approach to instrumentation. As the instrumentation program discovers code segments, it provides the ability to instrument code at any number of levels from program modules to individual instructions. Instrumented code 400 includes instructions 402–414 which represent all potential instrumentation "hooks" into the application. This approach allows instrumentation before and after the execution of each program segment of interest. This approach allows the instrumentation to observe, add, or modify program state. This embodiment of the present invention uses instrumentation to communicate program state to a data recorder and analysis module, which may be, e.g., a DLL.

The program transformations will not change program correctness, unless the procedure called changes program state (preferably side-effecting actions are not be used in the instrumentation library the SCL uses). Each of the instrumentation points is potentially a call-back to a function within the instrumentation library that can record and analyze data on the fly. The functions are linked dynamically at run-time. When the instrumentation process is complete, the binary is re-written to disk and ready for deployment. When the instrumented binary is run, the instrumentation functions will run along side executed code segments, recording and analyzing data as described below. As noted previously, care must be taken by the SCL to instrument only those portions of the executable of interest so as not to overly burden the performance of the instrumented application. The specific types of sensors and the areas of programs where the sensors are instrumented are based on the types of failure data being monitored by the SCL. Examples of such areas or failure data are described in later sections, below.

Once the binary is instrumented, deployed, and run, it will produce internal state data that the sensors or probes collect. The inline instrumentation can probe and record program state. As described above, the instrumentation points are call-backs to data collection and analysis functions loaded dynamically. When the program runs, it executes the instrumentation probes, which calls our data collection functions to record data of interest. When the program terminates, analysis functions can process the collected data and write statistics about the execution of the program as well as write failure data collected during execution to disk.

In a preferred embodiment of the present invention, analysis of data produced by the executions is performed locally on the user's computer. Accordingly, analysis functions can be included within the instrumentation module shipped with the instrumented binary. Analysis functions serve two purposes: first they process data recorded on the fly from instrumentation probes. Second, upon termination of the program, analysis functions write a summary of the statistical analyses performed on the program's execution, as well as failure data from abnormally terminated executions. This data, in turn, is sent back to the SCL for further analysis via a function also embedded in a module of the instrumented program.

Figure 5:
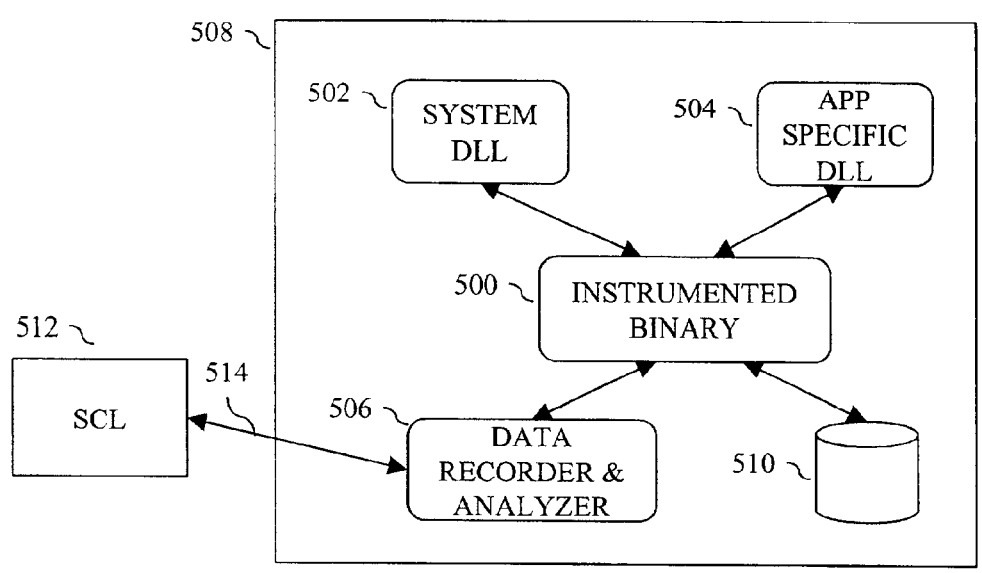
FIG. 5 is a schematic diagram showing an embodiment of the present invention.

FIG. 5 depicts an architecture of the system for collecting and analyzing execution information according to one embodiment of the present invention. Instrumented binary 500 together with shared system DLLs 502, application-specific DLLs 504, and data collection and analysis DLL 506 comprises user host 508. Data is collected and analyzed as the instrumented binary is run. Upon termination, statistics of interest about the execution are stored locally on disk 510 or user host 508. Upon abnormal termination, failure data is also written to disk 510. Both statistics about normal execution runs as well as failure data are sent to SCL 512 over secured Internet link 514 as described above.

Performing a significant amount of data analysis on the client site can reduce the total amount of data storage necessary, reduce network congestion, and distribute computational loads to an unobtrusive level for end users, and to a feasible level for the SCL.

System and Method for Creating Software Certificates

The instrumentation of software affords the opportunity to estimate the true reliability of software. Deploying such instrumented software on a large scale provides an unprecedented opportunity to create fairly accurate estimates of the true reliability of software. As described above, estimating the reliability of software has been extremely difficult in the absence of reliable data. This absence of reliability information might seem remarkable for a multi-billion dollar industry; however, the software industry is not very mature as far as a science goes. As a result, it is very difficult to estimate and predict the reliability for a given software application today.

The SCL uses the periodic transmissions of "normal" behavior together with failure transmissions to calculate a reliability estimate for the software application based on all such transmissions from all enlisted users. When the instrumented software first runs, it "registers" itself with the SCL.

This process establishes the initial operational time mark. From that point forward, the software sends periodic updates of normal working conditions as well as failure conditions. The local reporting service keeps track of operational time using process start and termination times as markers for operational time. The first time the reporting service detects a software failure, e.g., an application crash, abnormal termination, or loss of heartbeat, the reporting service reports the application failure and operational time to the SCL. This time is used by the SCL from all reporting versions of the software to estimate the reliability of the software. In absence of the periodic refresh from an instrumented application, the SCL will need to use the last known refresh report to estimate reliability. In addition to sending the operational time on observed failure, the reporting service sends the failure data to the SCL for failure analysis.

In one embodiment, reliability can be represented by computing the Mean Time To Failure (MTTF) for the software. For N instrumented versions of a software application, where each version i operates for time $t_i$ before encountering a failure, the MTTF for the software is given by equation (1) below.

$$MTTF = \frac{\sum_{i=1}^{N} t_i}{N} \quad (1)$$

Accordingly, MTTF estimates for a software application can be empirically generated. The greater the number of deployed (instrumented) applications, the higher the confidence in the estimate will be. Using the system and method of the present invention, the SCL can gather enough statistical data to establish confidence intervals, e.g., (90, 95, 99)-percent confidence intervals that the true MTTF of the software falls within a given interval range. Using the information about the environment in which the software runs together with its operational time before an observed failure, the SCL can create certificates of reliability. Employing confidence intervals, the SCL can modify the example certificate described earlier as follows:

Given a Pentium III machine, with 128 MB of ram, under light to moderate load, running Windows 2000®(service pack 1), software vendor SV's web server 'WS' v2.0a true MTTF is in the range of [1500,1600] hours with 95 percent confidence.

To date, this kind of certificate generation has not been possible because of the lack of approach, technology, and a scalable solution necessary to create certificates with confidence. Individual users can always monitor their own systems to see how often a software application fails, however, this information is not useful in the larger context of the software's true reliability unless there is some means of capturing this same information from a statistically significant number of users on a statistically significant number of platforms.

The amount of time it takes to certify software is dependent on two main factors: the number of enlisted users and the level of confidence the vendor wishes to have in the estimate. The greater the number of users, the less time it will take to achieve reliability estimates for a given level of confidence. Alternatively, lower confidence can permit faster certificate production, albeit with a larger confidence interval.

If the present invention is to be used to determine the accuracy or "correctness" of the results output by a software product, additional information should be provided by the software vendor. In software testing, it is a well-known that "oracles" of correct behavior are needed to judge the accuracy of a software product. Such oracles are used to determine if the software is producing the correct output in response to its current state and input. If a vendor were willing to provide an oracle of correct behavior, then this oracle could be instrumented in the executables as post-conditions on function calls to check correctness of operation.

System and Method for Analyzing Failure Data

Types of observable failures can be categorized into the following types: Crash, Restart, Abort, Silent, and Hindering. In one embodiment, the instrumentation probes can detect and record error codes on return from functions, unhandled exceptions, memory access violations, array bounds exceeded, integer divide by zero exceptions, illegal instruction executions (e.g., executing data as code), unauthorized attempts to execute a privileged instruction, stack overflows, normal terminations, remote kills, terminal kills, and internal signals. A different probe can be included in the instrumentation to record each type of event when it occurs. The probes can be enabled or disabled [By whom?] selectively depending on the type of failure data to be observed for a given application. The more data that is collected about a failure, the greater the potential for correct diagnosis of the cause.

In addition to the data collection and analysis described above, the present invention also provides the capability to analyze performance data for the software. This is accomplished by instrumenting the application with a heart beat process that communicates with the data collection, analysis, and reporting service DLL. Such a heart beat process can detect slow downs, hard freezes, and even program crashes that were not detected with other instrumentation. As the program runs, the heart beat sensors record observable failure symptoms to the companion DLL.

For the data received periodically from users indicating normal behavior, the SCL receives not only pre-processed data on the statistics of the normal executions, but also data about the environmental conditions in which the software runs. The software certificates will reflect the reliability of the software under given environmental configurations. In order to create certificates that reflect different configurations, the SCL need to be able to partition data such that meaningful information about reliability can be inferred for each partition. The SCL should take into consideration several factors when determining the appropriate partitions. First, the SCL should discover and extract the factors that are relevant to the software being certified. For example, in the case of one application, the amount of memory might not matter at all, while in another, memory size might be critical to the program running properly. In addition to this, the SCL also needs to partition the data appropriately so that it is not too fine-grained and specific (For a Pentium 550 with 128 MB RAM, with a virtual memory size of 512 MB, that has an IBM IDE hard drive, model #31451, running version 2.1 of Adobe Photoshop, the MTTF is 8500 hours), and it is not too coarse and generic (For a computer with an Intel Pentium, the MTTF is 4500 hours) to be useful.

There are several clustering techniques that can be used for producing the desired results. Clustering techniques comprise classification of patterns into groups (clusters) in a manner that requires minimal human intervention. The problem of clustering has been studied previously in several fields and there are a variety of clustering algorithms available.

As described above, the failure data collected according to the present invention comprises data such as execution paths, stack traces, error codes, abort signals, program state, and symbolic information. Because the SCL is collecting this information from all failed executions of the application from all users, it will have a significant body of failure information to analyze root causes of failures for the software vendor. In order to do this the SCL needs to essentially factor the data such that it gets statistically significant correlations. These can be used to narrow down the components in the software where the problem could originate. In addition, by leveraging symbolic information in the binary, the SCL can trace problems back to specific modules and even lines of source code.

This process is similar to the one described earlier in that the SCL needs to discover which features are meaningful in the failure data, and additionally, which features are associated with the most failures. The first stage is feature extraction. This can be achieved by using a feature extraction process such as principal components analysis. The second stage may use multivariate data analysis technique for processing the data. Correspondence analysis, a class of multivariate analysis techniques, may also be used for analyzing failure data. Correspondence analysis takes into account the various factors present, and builds a partitioning scheme whereby the amount of variation in the data is minimized and relationships become more obvious. One of the more salient aspects of correspondence analysis is that it can handle data with high dimensionality and large volume.

System and Method for Analyzing Feature/Function Usage

As described above the instrumentation approach of the present invention facilitates the gathering of many types of execution characteristics from application programs. Instrumenting a program at the function level allows the SCL to capture sequences of function calls for any given run of the program. A "feature" of a program denotes any high level capability of that program that involves the execution and/or interaction of one or more functions. The normal operation of different features can be highly variable; one feature may have only one valid function sequence while another feature could have numerous function sequences denoting normal operation. A feature can involve even only part of a single function.

In one embodiment, a learning automata can be created. This automata will recognize the beginning and end of a feature based on training of instrumented software. Note that several actions within the application can be associated with a single feature. For instance, there may be a whole set of actions the user can perform that all fall under the "Print" feature. Alternatively, the SCL may choose to separate these into different features: "Print Select Pages", "Print All", "Print Activated From Menu", "Print Activated From Toolbar Icon", etc. With increased refinement of the print feature, an application vendor can obtain data about how many users print by selecting the menu option versus selecting the toolbar shortcut.

The application gets sent to N users, collecting traces from each usage over time. The trace data is processed locally with a trained feature identification tool, and then reported back to the SCL during periodic updates. The SCL can separate the trace usage summaries from all users into counts of feature usage.

In implementing a feature/function analysis system, the SCL should consider various issues such as: where and how to insert instrumentation code; what instrumentation code is appropriate for a given feature; what is the overhead cost associated with the instrumented code; how to characterize features and return this information back to software vendors.

One challenge with instrumenting executables to recognize feature execution is obtaining information that maps features to function sequences. In one embodiment, this mapping is known to the software vendors but not to the SCL. Software vendors could provide a list of features of interest that correspond to known function sequences. Statistical data corresponding to these features could be gathered periodically and reported to the SCL.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for certifying a software product's reliability, said method comprising:
   establishing a software certification laboratory;
   receiving the software product at the software certification laboratory;
   instrumenting the software product, by the software certification laboratory, to collect a plurality of usage data and a plurality of failure data when the software product is being executed;
   digitally signing the software product to be verified;
   verifying the digital signature of the software product;
   employing a residual testing tool in the software product that collects information about the software product behavior as the software product is used;
   providing the software product to a plurality of users;
   receiving, at the software certification laboratory, the plurality of usage data and the plurality of failure data from each of the plurality of users;
   analyzing the plurality of usage data and the plurality of failure data;
   building an operational profile according to a result from the analyzing; and
   issuing a certificate of reliability to the software product based on the result from the analyzing.

2. The method of claim 1, wherein the software certification laboratory is independent of a vendor that provides the software product.

3. The method of claim 1, wherein the operational profile is returned from the software certification laboratory to a vendor that provides the software product for reference.

4. The method of claim 1, wherein the signature of the software product is signed by a software product vendor.

5. The method of claim 1, wherein the signature of the software is verified by the software certification laboratory.

6. The method of claim 1, wherein the certification is presented by computing a Mean Time to Failure (MTTF) for the software product, wherein the MTTF is given by $$MTTF = \frac{\sum_{i=1}^{N} t_i}{N},$$

wherein N is a number of instrumented versions of the software product, and $t_i$ represents the time for each version before encountering a failure.

7. A system for certifying a software product's reliability, comprising:
- a software product received from a product vendor; and
- a software certification laboratory for instrumenting the software product to collect information about the software behavior when the software product is used,
- wherein the software product, after instrumented by the software certification laboratory, is used by a plurality of users, and the information collected by the software products includes a plurality of usage data and a plurality of failure data from each of the plurality of users,
- wherein the software certification laboratory receives and analyzes the plurality of usage data and the plurality of failure data from each of the plurality of users collected by the software product, builds an operational profile according to a result from the analyzing, and issues a certificate of reliability to the software product, and
- wherein the software certification laboratory is further configured to:
  - digitally sign the software product to be verified;
  - verify the digital signature of the software product; and
  - employ a residual testing tool in the software product that collects information about the software product behavior as the software product is used.

8. The system of claim 7, wherein the software certification laboratory instruments the software product with a residual testing tool that collects information about the software behavior when the software product is used.

9. The system of claim 8, wherein the software product is provided by a software vendor that is independent from the software certification laboratory.

10. The system of claim 9, wherein the vendor provides a digital signature on the software product.

11. The system of claim 10, wherein the software certification laboratory verifies the digital signature of the software product.

12. The system of claim 7, wherein the operational profile is returned from the software certification laboratory to a vendor that provides the software product for reference.

13. The system of claim 7, wherein the collected data is scrubbed of personal information of the plurality of users.

14. The system of claim 7, wherein the software certification laboratory instructs the software product to collect the information periodically.

15. The system of claim 7, wherein the certification is presented by computing a Mean Time to Failure (MTTF) for the software product, wherein the MTTF is given by $$MTTF = \frac{\sum_{i=1}^{N} t_i}{N},$$

wherein N is the number of instrumented versions of the software product, and $t_i$ represents the time for each version before encountering a failure.

16. A method for certifying a software product's reliability, comprising:
- employing a residual testing tool to the software, wherein the residual testing tool is configured to collect information about the software product behavior as the software product is used;
- digitally signing the software product;
- distributing the signed software product to a software certification laboratory, wherein the software certification laboratory verifies the digital signature of the software product and instruments the residual testing tool employed in the software product to collect information about the software product behavior;
- distributing the verified software product to a plurality of users, wherein the residual testing tool collects a plurality of usage data and a plurality of failure data from each of the plurality of users while the software product is used;
- reporting the collected usage and failure data to the software certification laboratory; and
- analyzing the collected data to issues a certificate of reliability to the software product.

17. The method of claim 16, wherein the software certification laboratory further builds an operational profile according to a result from the analyzing.

18. The method of claim 16, wherein the certification is presented by computing a Mean Time to Failure (MTTF) for the software product, wherein the MTTF is given by $$MTTF = \frac{\sum_{i=1}^{N} t_i}{N},$$

wherein N is a number of instrumented versions of the software product, and $t_i$ represents the time for each version before encountering a failure.

* * * * *